(12) United States Patent
Gao et al.

(10) Patent No.: US 8,736,102 B1
(45) Date of Patent: May 27, 2014

(54) MULTIFUNCTIONAL POWER CONVERTER

(75) Inventors: Lijun Gao, Renton, WA (US); Shengyi Liu, Sammamish, WA (US); Kamiar J. Karimi, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 840 days.

(21) Appl. No.: 12/899,664

(22) Filed: Oct. 7, 2010

(51) Int. Cl.
*H02J 3/00* (2006.01)

(52) U.S. Cl.
USPC ............... 307/17; 307/39; 307/45; 307/26; 363/71; 363/41; 363/127; 363/55

(58) Field of Classification Search
CPC .......... H01F 29/02; H01F 27/06; H01F 38/18
USPC ........... 307/25–28, 72–76, 82–84, 30, 43, 85, 307/66; 363/17, 56.02, 58, 127, 89, 141, 363/68, 37, 34, 56.01, 71, 41, 40, 43, 65; 323/301, 361, 222
See application file for complete search history.

(56) References Cited

U.S. PATENT DOCUMENTS

| | | | |
|---|---|---|---|
| 5,038,264 A | 8/1991 | Steigerwald | |
| 5,541,828 A | 7/1996 | Rozman | |
| 5,654,879 A | 8/1997 | Lopez et al. | |
| 6,697,271 B2 * | 2/2004 | Corzine | 363/71 |
| 7,787,270 B2 * | 8/2010 | NadimpalliRaju et al. | 363/68 |
| 7,808,125 B1 * | 10/2010 | Sachdeva et al. | 307/82 |
| 7,978,483 B2 * | 7/2011 | Mazzola et al. | 363/17 |
| 2004/0150374 A1 * | 8/2004 | Kraus | 322/4 |
| 2010/0246228 A1 * | 9/2010 | Kazlauskas | 363/127 |

OTHER PUBLICATIONS

Wing-Hung Ki and Dongsheng Ma, "Single-Inductor Multiple-Output Switching Converters", 2001 IEEE, pp. 226-231, The Hong Kong University of Science and Technology, Clear Water Bay, Hong Kong SAR, China.

* cited by examiner

*Primary Examiner* — Rexford Barnie
*Assistant Examiner* — Jagdeep Dhillon
(74) *Attorney, Agent, or Firm* — Smith Moore Leatherwood LLP

(57) ABSTRACT

The multifunctional power converter apparatus and method includes an input power stage configured to receive a DC input voltage from a DC power source and convert the DC input voltage to an AC or DC output voltage. At least one electrical power conversion electronic circuit is connected to an output of the input power stage, a DC output circuit; an AC output circuit; and a controller configured to control the input power stage, the DC output circuit and the AC output circuit. The controller is configured to automatically control the power converter output voltage based on a preselected user input.

19 Claims, 5 Drawing Sheets

MULTIFUNCTIONAL POWER CONVERTER

BACKGROUND

The application generally relates to a power converter. The application relates more specifically to a configurable power converter and a control algorithm for implementing circuit reconfiguration to convert a DC voltage to a plurality of voltage levels and/or frequencies to meet load power requirements.

Power converters may be used to convert an input voltage to provide one or more voltages having different parameters, e.g. voltage and frequency. One typical solution is to use multiple independent power converters with different input/output circuit specifications to meet various load voltage requirements. Such independent converters may be packaged together in a single enclosure, or may be provided separately for each independent use. Multiple independent converters are more expensive to build, and may be bulky, heavy, and inconvenient to use.

Direct current (DC) voltage sources may include fuel cells, batteries, solar cells, and other similar energy sources. Many DC voltage sources are susceptible to voltage decay or fluctuations over time, which may cause a power converter voltage to decay or fluctuate as well, and result in potential problems to meet load needs.

What is needed is a single compact and light-weight power converter that is configurable to provide a plurality of output voltages from a range of input voltages, wherein the output voltage specifications are selectable either by a user or automatically.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

SUMMARY

One embodiment relates to a multifunctional power converter. The multifunctional power converter includes an input power stage configured to receive a DC input voltage from a DC power source and convert the DC input voltage to an AC or DC output voltage. At least one electrical power conversion electronic circuit is connected to an output of the input power stage, a DC output circuit; an AC output circuit; and a controller configured to control the input power stage, the DC output circuit and the AC output circuit. The controller is configured to automatically control the power converter output voltage based on a preselected user input.

Another embodiment relates to a method for controlling a multifunction power converter. The method includes selecting the output voltage of the multifunction power converter; determining if the selected output voltage operation is AC or DC; determining the selected voltage; and, in response to determining the voltage and operation, configuring a first pair of switches connected at an output of an electronic power converter and a second pair of switches at an input to the electrical power conversion to provide the selected output voltage operation from one of a plurality of output voltage operations.

Still another embodiment relates to a multifunctional power converter. The multifunctional power converter includes an input stage configured to receive a DC input voltage and convert the DC input voltage to an AC or DC output voltage, a plurality of electrical power conversion electronic circuits, a plurality of DC output voltages for DC power supply at a plurality of DC voltages; a plurality of AC output voltages for AC power supply at a plurality of AC voltages. A controller is configured to control the input stage, the plurality of DC output voltages and the plurality of AC output voltages. The controller is further configured to selectively provide 3-phase shift control, harmonic control, and output frequency control. The output voltages for AC power provide a plurality of AC voltages comprising variable frequency, one phase AC power and three phase AC power.

Certain advantages of the embodiments described herein are a power converter architecture design with a configurable structure and flexible control that can be used to convert a DC input with a wide input voltage range to various levels of DC and AC output voltages to meet different load requirements.

Another advantage is a power converter configurable to convert a voltage source to match most commonly used voltage requirements in aircraft or other vehicle power systems, including 32VDC, ±270VDC, 1Φ/3Φ 115VAC, and 1Φ/3Φ 230VAC, voltages which are commonly used in aircraft. Other output voltages may also be changing transformer ratio. The configurable architecture can be easily used for producing voltages other than those identified here.

Still another advantage is a simplified converter design, with less components, reduced volume and weight, and improved efficiency and reliability.

Alternative exemplary embodiments relate to other features and combinations of features as may be generally recited in the claims.

DETAILED DESCRIPTION OF THE EXEMPLARY EMBODIMENTS

Figure 1:
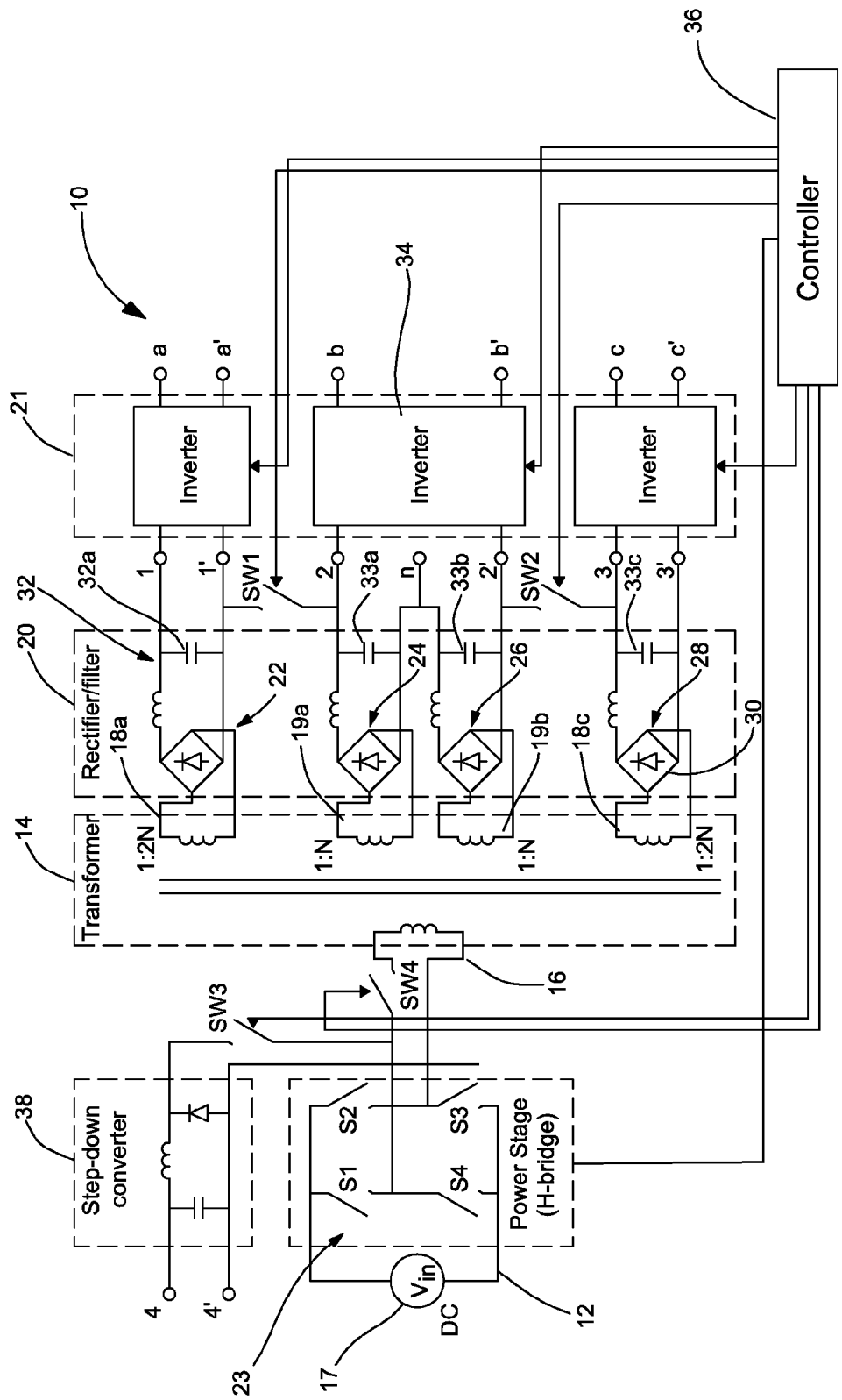
FIG. 1 is an exemplary embodiment of a multifunction power converter.

Referring to FIG. 1, a multifunction power converter 10 includes a front-end stage 12 connected to a pair of switches SW3 and SW4. Switch SW4 connects front-end stage 12 to a transformer 14. Transformer 14 includes at least one primary winding or coil 16 and a plurality of secondary or output circuit windings or coils 18, 19. Each of transformer output circuit windings 18, 19 provide power to a rectifier/filter stage 20. Rectifier/filter stage 20 includes a plurality of rectifier/filters 22, 24, 26 and 28. Each rectifier/filter 22, 24, 26 and 28 includes a full bridge converter 30 for converting an AC transformer output voltage to a DC output voltage, and an L-C filter 32 to reduce ripple voltage at the output circuit terminals.

The output terminals 1-1', 2-2' and 3-3' of rectifier/filter stage 20 are connected to inverter stage 21. Inverter stage includes a plurality of inverters 34. Inverters 34 are configured to generate an AC output voltage at each inverter 34 output terminals at a controlled voltage and frequency. Three inverters 34 at the output circuits of multifunction power converter 10 are controllable by a controller 36 to maintain a phase angle of 120° between phases to provide three-phase output power, e.g., for motor loads, or a distribution bus. Controller also maintains a predetermined frequency of the output voltage of inverters 34, which frequency is selectable, e.g., 60 Hz or 400 Hz. Inverters 34 may be any inverter having a general DC-AC inverter topology.

Transformer 14 includes four secondary windings 18, 19. A first pair of secondary windings 19 is wound to provide half of the turns ratio (1:N) as that of the second pair of secondary windings 18 having a turns ratio of (1:2 N), so that output voltages are configurable as discussed in greater detail below with respect to FIG. 2. Switches SW1 and SW2 are controlled by controller 36 according to the desired output voltage of the multifunction power converter 10, as explained below.

A DC-DC step down converter 38 is connected to front-end stage 12 through SW3 in parallel with SW4 and transformer 14, and controlled by controller 36 as will be further discussed below with respect to the control flow diagram of FIG. 2. Step down DC-DC converter 38 provides a reduced DC voltage, e.g., 32 VDC at output terminals 4-4'.

Controller 36 also includes control logic for selecting between step down converter 38 and transformer 14 for the power flow. Switches SW3 and SW4 control power flow between step down converter 38 and transformer 14, respectively. The operation of step down converter 38 or transformer 14 are mutually exclusive, i.e., when SW3 is closed, front-end stage 12 is connected to step down converter 38 and SW4 is open. Conversely, when SW4 is closed, SW3 is open and front-end stage 12 is connected to transformer 14.

Controller 36 may execute or use a single or central control algorithm or control system to control the operation of multifunction power converter 10, including front-end stage 12, switches SW1, SW2, SW3, SW4, rectifier/filter 20 and inverter stage 21. In one embodiment, the control algorithm (s) can be computer programs or software stored in nonvolatile memory having a series of instructions executable by a microprocessor. While the control algorithm can be embodied in a computer program(s) and executed by the microprocessor, it will be understood by those skilled in the art that the control algorithm may be implemented and executed using digital and/or analog hardware. If hardware is used to execute the control algorithm, the corresponding configuration of controller 36 can be changed to incorporate the necessary components and to remove any components that may no longer be required. In still another embodiment, controller 36 may incorporate multiple controllers, each performing a discrete function, with a central controller that determines the output voltages of multifunction power converter 10.

Figure 2:
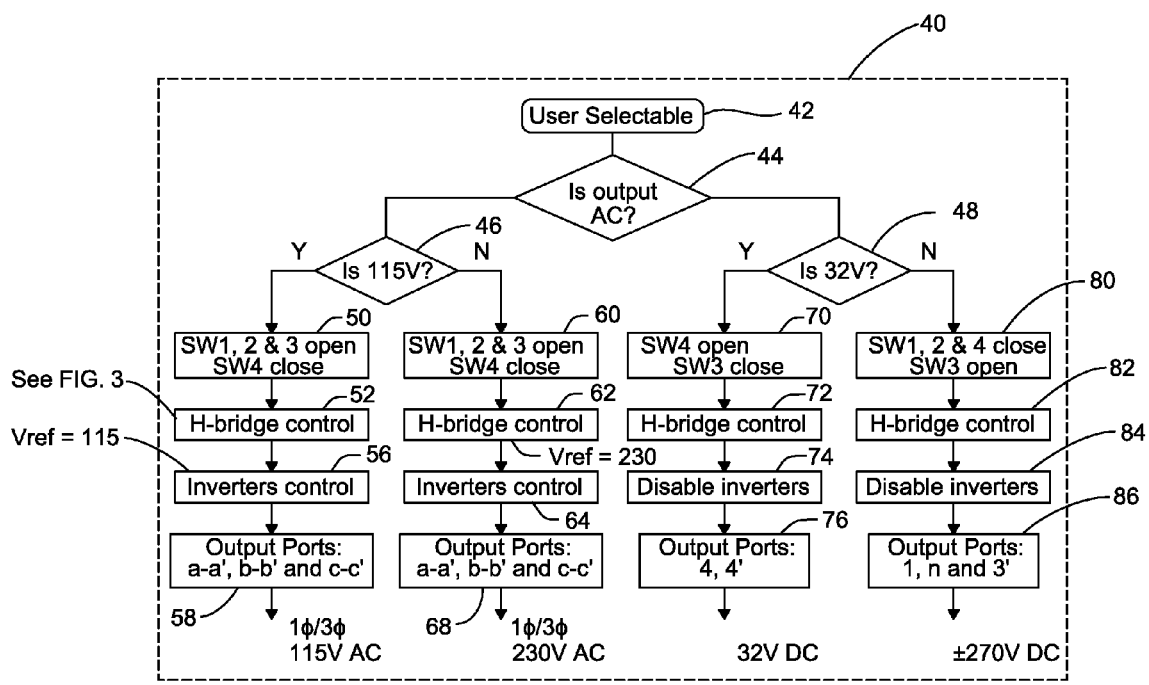
FIG. 2 is an exemplary control logic flow diagram for controlling a multifunction power converter.

Referring to FIG. 2, an exemplary control logic algorithm 40 may be incorporated into controller 36. The logic sequence 40 is described as follows. Initially, a user has an option to select the output voltage of multifunction power converter 10, e.g., through a user interface, selector switch, or similar selecting means (not shown) or an automatic sensing and selecting system, as indicated at step 42. The output voltage selection means may also be automated through a computer interface or centralized control system. At step 44 the system determines whether the user selected AC or DC operation. Next, if AC operation is selected, the system proceeds to step 46 to determine the selected AC voltage at step 46; if AC operation is not selected (i.e., DC operation is selected) at step 44, then the user proceeds to step 48 to determine the selected DC voltage. Returning to step 46, if the system determines that 115VAC is selected, the system proceeds to step 50 to configure switches SW1, SW2, SW3 and SW4 as follows: SW1, SW2, SW3 are open (non-conducting) and SW4 is closed (conducting). At step 52, front-end stage 12 controls the input voltage to transformer 14 by controllably switching an H-bridge 23, as further described below with respect to FIG. 4, with a reference voltage ($V_{ref}$) equal to 115 volts. At step 56 inverters 34 are controlled in response to the user selection, to generate 3-phase AC output voltage of 115 VAC. At step 58, the output ports of each of inverters 34, respectively designated as output ports a-a', b-b' and c-c', each provide 115 VAC, with phases a, b and c shifted at 120° with respect to one another to provide three-phase power supply as well as single phase power supply.

Figure 3:
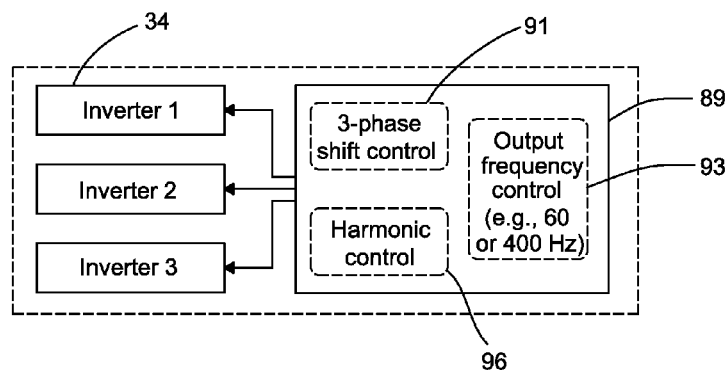
FIG. 3 is an exemplary inverter control scheme for use with a multifunction power converter.

As illustrated in FIG. 3, controller 36 also includes the necessary logic for controlling inverter parameters. Inverter control module 90 includes 3-phase shift control 91, harmonic control 96, and output frequency control 93. Inverter control module 90 may reside within controller 36, or alternately within one or more inverters 34, or a combination thereof.

Returning to step 46 of control logic 40, if the user selection is 230VAC, the system proceeds to step 60. Controller 36 configures switches SW1, SW2, SW3 and SW4 as follows: SW1, SW2, SW3 are open (non-conducting) and SW4 is closed (conducting). At step 62, front-end stage 12 controls the input voltage to transformer 14 by controllably switching H-bridge 23, with a reference voltage ($V_{ref}$) equal to 230 volts. At step 64, inverters 34 are controlled in response to the user selection, to generate 3-phase AC output voltage of 230 VAC. At step 68, the output voltage ports of each of inverters 34, respectively designated as output ports a-a', b-b' and c-c', each provide 230 VAC, with phases a, b and c shifted at 120° with respect to one another to provide three-phase power supply as well as single phase power supply.

Returning now to step 44 if control logic 40, if a DC output voltage is selected, the system proceeds to step 48 to determine which DC voltage option is selected. If the selected voltage is 32V, the system proceeds to step 70, and controller 36 opens SW4 and closes SW3. By opening SW4, transformer 14, rectifier/filter 20 and inverter stage 21 are switched out of the power circuit. SW3 connects step down converter 38 to voltage input 17 through front-end stage 12. H-bridge 23 is controlled by controller 36 as follows: S2 is in a constant open state; S3 is in a constant closed state; and S1 and S4 operate as alternating synchronized rectifiers, i.e., S1 in the closed state while S4 is in the open state, and S1 in the open state while S4 is in the closed state. The multifunction power converter 10 provides output power of 32 VDC from ports 4-4'.

Returning to control logic 40 at step 48, if the system determines that the selected voltage is +/−270 VDC, then the system proceeds to step 80. At step 80, controller 36 configures switches SW1, SW2, SW3 and SW4 as follows: switches SW1, SW2 and SW4 are closed, and switch SW3 is open. The system proceeds next to step 82. As can be seen from FIG. 1, when SW1 and SW2 are closed at the same time, transformers 18a and 19a are connected in series through full-wave rectifiers 22, 24 across ports 1 and n. At step 84, inverters 34 are disabled to prevent power transfer to the inverter output terminals a-a', b-b' and c'-c'. At step 86, the voltage across capacitor 32a is controlled at approximately 180 VDC by front-end stage 12, and the voltage across capacitor 33a is controlled at 90 VDC. The cumulative voltage taken across ports 1 and n is therefore +270VDC. Similarly, transformers 18c and 19b are connected in series through full bridge rectifiers 26, 28 across ports 3' and n. The voltage across capacitor 32c is controlled at approximately 180 VDC by front-end stage 12, and the voltage across capacitor 33b is controlled at 90 VDC. The cumulative voltage taken across ports 3 and n is therefore −270VDC. The cumulative voltage across ports 1 and 3' is 540VDC, which is also available as an output voltage option in the switch configuration with SW1, SW2 and SW4 closed.

Figure 4:
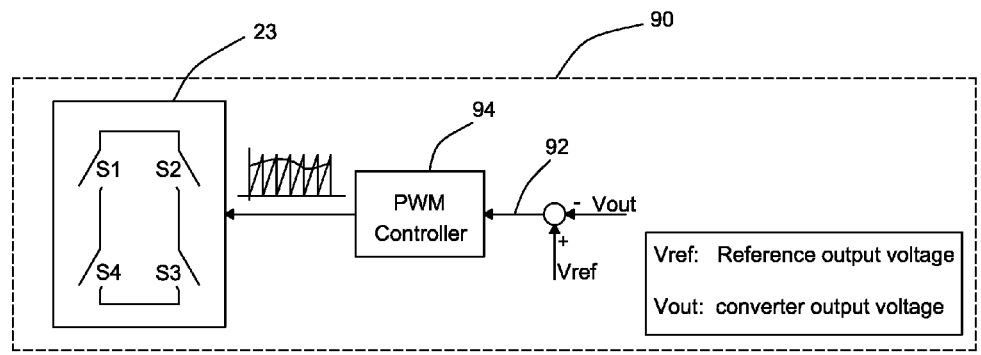
FIG. 4 illustrates an exemplary Pulse Width Modulation (PWM) control diagram for an H-bridge control.
Figure 5:
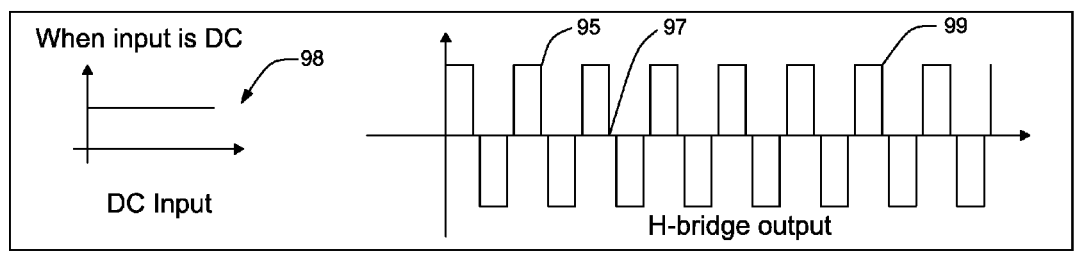
FIG. 5 is an example of the input and output circuit voltage profile of the H-bridge switching device.

Referring next to FIGS. 4 & 5, control of H-bridge 23 is illustrated as a voltage sensing feedback loop 90. Feedback loop 90 senses a reference voltage $V_{ref}$ and subtracts a sensed output voltage $V_{out}$, e.g., at an output terminal of multifunction power converter 10 and generates an error signal 92 as the difference of $V_{ref}$ and $V_{out}$. Error signal 92 is input to a PMW controller 94, which controls an H-bridge 23 by selectively switching S1, S2, S3 and S4 to generate the desired voltage. $V_{ref}$ is a preset reference voltage signal corresponding to user's selection of output voltage. PWM controller 94 varies the pulse width or duty cycle of H-bridge 23 to increase or decrease the output voltage.

FIG. 5 shows an exemplary H-bridge output voltage waveform 99 based on a given DC input voltage 98. In one exemplary embodiment a DC source 17 may have a nominal operating voltage of 60VDC, e.g., a fuel cell, battery or solar cell array. During operation, DC source 17 may vary between actual voltages ranging from approximately 40VDC to 80VDC, due to, e.g., voltage decay and/or fluctuation. In the example of FIG. 5, H-bridge output voltage is a symmetrical positive and negative square waveform regulated by switching the duty cycle. As the duty cycle decreases, gaps 97 increase in width and the positive and negative pulses 95 decrease correspondingly in width, and the output voltage decreases proportionately.

Figure 6:
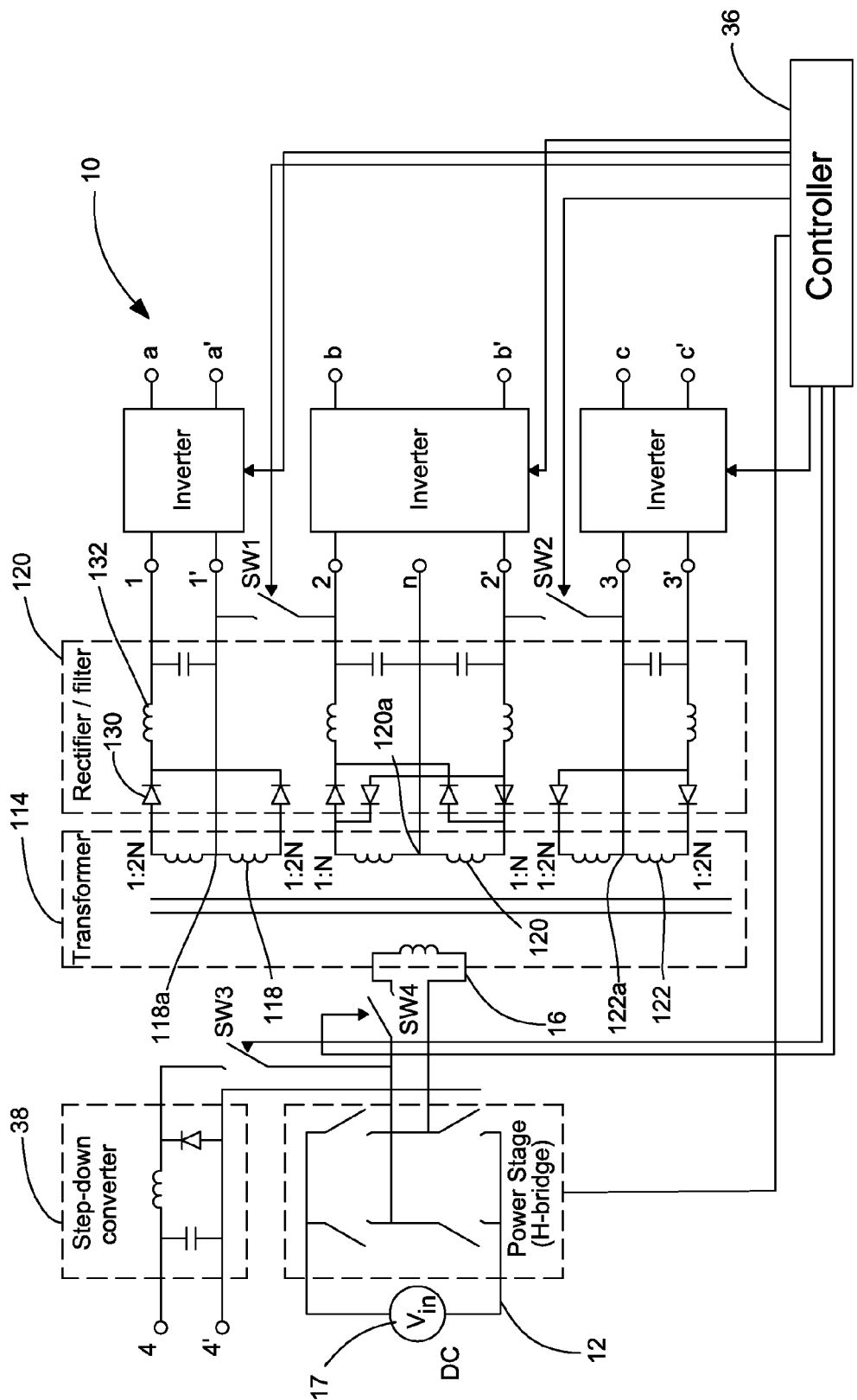
FIG. 6 is an alternate embodiment of a multifunction power converter.

Referring next to FIG. 6, in another exemplary embodiment, an multifunction power converter 10 may be implemented using a different topology for the transformer and rectifier/filter than the transformer 14 and rectifier/filter 20 illustrated in FIG. 1. A transformer 114 includes a primary winding 16 and three secondary windings 118, 120 and 122. Each of secondary windings 118, 120 and 122 is center tapped to derive an output terminal or a neutral terminal n. Secondary windings 118 and 122 are subdivided into two sub-windings by center taps 118a and 122a, respectively, with each sub-winding being wound with a turns ratio of 1:2 N with respect to primary winding 16. Secondary winding 120 is also divided into two sub-windings by center tap 120a, with each sub-winding having a turns ratio of 1:N with respect to primary winding 16.

Secondary windings 118 and 122 shown at the top and bottom of FIG. 6 are configured with a diode 130 at opposite ends of windings 118 and 122, respectively, to form a full-wave rectification at the output of windings 118, 122. Each output circuit is filtered by L-C filters 132 at output ports 1-1' and 3-3'. Two pairs of diodes connected to the center secondary winding 120 of transformer 114 are configured such that a full wave rectification is seen at both port 2-n and 2'-n. The rectified output wave of secondary winding 120 is filtered by a pair of L-C filters 32 and the DC voltage output applied to terminals 2-2'. Also, winding 120 is center tapped and connected to neutral terminal n. One half of the voltage available at 2-2' is available across terminals 2-n, and across terminals 2'-n. Controller 36 controls the embodiment of FIG. 6 according to the algorithm described in FIG. 2 above. Similarly, control of front-end stage 12 is the same as set forth with respect to FIGS. 4 and 5 above. Multifunction power converter 10 also includes DC-DC step down converter 38 to selectably provide 32 VDC as described above. All switching configurations for output ports is the same as described above with respect to FIG. 2.

Figure 7:
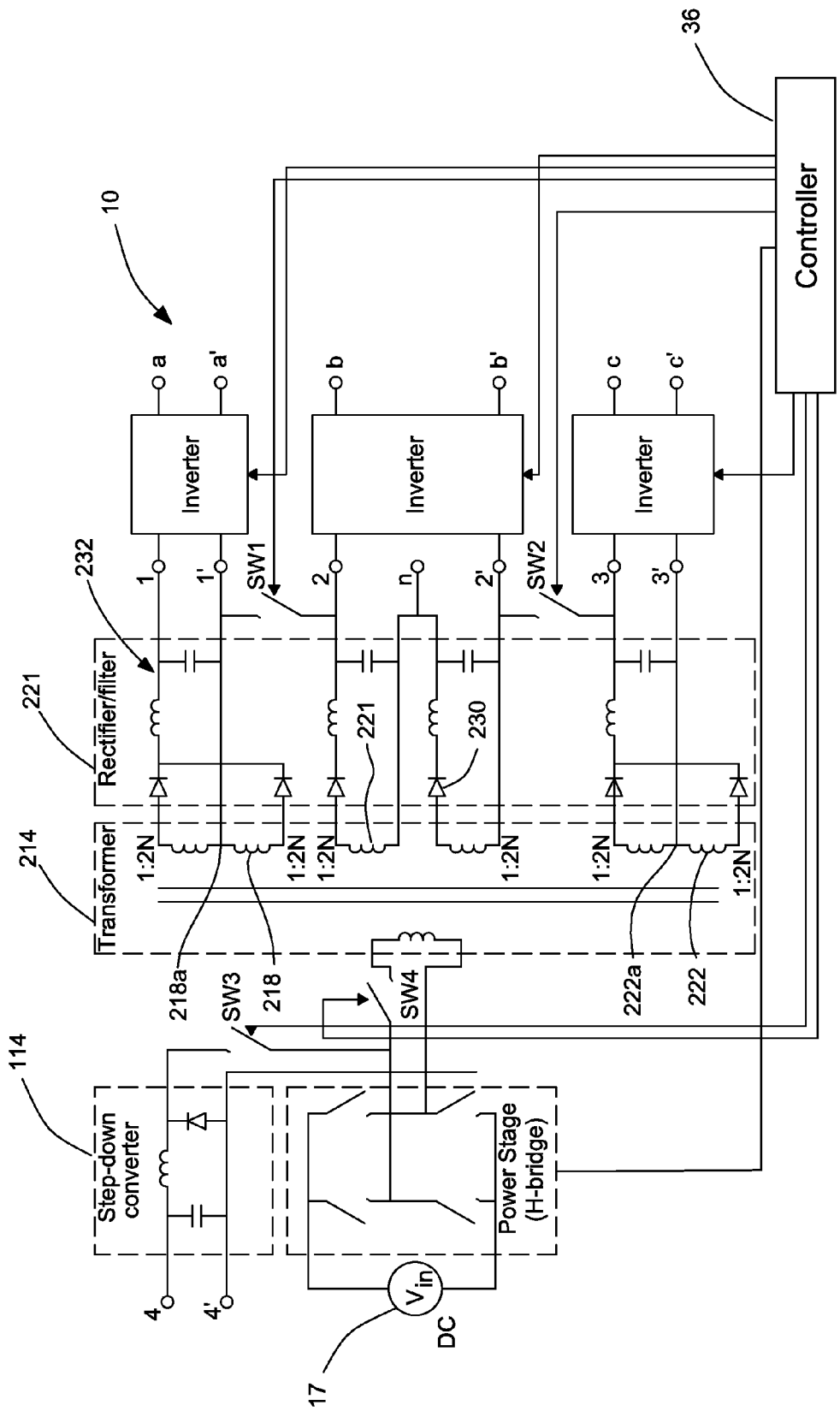
FIG. 7 is another alternate embodiment of a multifunction power converter.

Referring next to FIG. 7, an multifunction power converter 10 arrangement may be implemented using a different topology for the transformer and rectifier/filter than the transformers 14, 114 and rectifier/filters 20, 121 illustrated in FIGS. 1 and 6, respectively. Controller 36 controls multifunction power converter 10 according to the same algorithm as described in FIG. 2 above, and all switching configurations for output ports is the same as described above with respect to FIG. 2. A transformer 214 includes a primary winding 16 and four secondary windings 218, 220, and 222. Each of secondary windings 218, and 222 is center tapped to derive an output terminal 1' and 3', respectively. Secondary windings 218 and 222 are subdivided into two sub-windings by center taps 218a and 222a, respectively, with each sub-winding being wound with a turns ratio of 1:2 N with respect to primary winding 16. Secondary winding 220 and secondary winding 221 are connected to a common neutral terminal n. Each of secondary windings 220, 221, has a turns ratio of 1:N with respect to primary winding 16.

Secondary windings 218 and 222 shown at the top and bottom of FIG. 7 are configured with a diode 230 at opposite ends of windings 218 and 222, respectively, to form a full-wave rectification at the output of windings 218, 222. Each output circuit is filtered by L-C filters 32 at output ports 1-1' and 3-3'. Each of the center windings 220 and 221 includes a diode 230 and is configured such that a half wave rectification is seen at both port 2-n and 2'-n. The rectified output wave of secondary winding 220 and secondary winding 221, is filtered by a pair of L-C filters 32 and the DC voltage output applied to terminals 2-2'. Also, winding 220 is connected to neutral terminal n through diode 230 and LC filter 232. One half of the voltage available at 2-2' is available across terminals 2-n, and across terminals 2'-n. Controller 36 controls the embodiment of FIG. 7 according to the algorithm described in FIG. 2 above. Similarly, control of front-end stage 12 is the same as set forth with respect to FIGS. 4 and 5 above. Multifunction power converter 10 also includes DC-DC step down converter 114 to selectably provide 32 VDC as described above. All switching configurations for output ports are the same as described above with respect to FIG. 2.

It should be noted that the voltage levels described herein—e.g., 115 VAC, 230 VAC, 32 VDC and +/−270 VDC, are by way of example only, and other voltage levels may be used within the scope of the appended claims.

It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

It is important to note that the construction and arrangement of the MPC as shown in the various exemplary embodiments is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

It should further be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

What is claimed is:

1. A multifunctional power converter, comprising:
    an input power stage configured to receive a DC input voltage from a DC power source and convert the DC input voltage to an AC or DC output voltage,
    at least one electrical power conversion electronic circuit connected to an output of the input power stage,
    at least one DC output circuit;
    at least one AC output circuit;
    a controller configured to control the input power stage, the at least one DC output circuit and the at least one AC output circuit; and
    a first pair of switches connected between an output of the electrical power conversion electronic circuit and an input of an inverter; and a second pair of switches between the input power stage and an input to the electrical power conversion electronic circuit;
    wherein the controller automatically controls the power converter output voltage from a plurality of output voltage operations based on a preselected user input.

2. The multifunctional power converter of claim 1, wherein the at least one electrical power conversion electronic circuit comprises:
    a transformer having a primary winding and a plurality of secondary windings;
    a rectifier and an inverter connected to each secondary winding of the plurality of secondary windings;
    each of the rectifiers configured to generate a DC voltage at the at least one DC output; and
    each of the inverters connected to each rectifier and configured to receive the DC voltage of the at least one DC output terminal and generate an AC output at the at least one AC output.

3. The multifunctional power converter of claim 2, wherein the at least one electrical power conversion comprises three inverters; and the controller configured to control the first pair of switches interoperable to provide one of
    a) three phase AC voltage and power at the at least one AC output, or
    b) DC voltage at the at least one DC output terminal.

4. The multifunctional power converter of claim 3, wherein the three inverters are configured to be disabled, and wherein, when the inverters are disabled, the at least one DC output comprises three DC outputs.

5. The multifunctional power converter of claim 1, wherein the at least one AC output provide a plurality of AC voltages, wherein each AC voltage further comprises: a variable frequency, a single phase output and a three phase output.

6. The multifunctional power converter of claim 3, wherein the controller controls the converter output voltage to be one of AC or DC by concurrently opening the first pair of switches.

7. The multifunctional power converter of claim 6, wherein the controller controls the output voltage to a predetermined voltage level.

8. The multifunctional power converter of claim 1, wherein the converter is a step-down convert for converting the DC input voltage to 32 VDC.

9. A method for controlling a multifunction power converter comprising:
    selecting the output voltage of the multifunction power converter,
    determining if the selected output voltage operation is AC or DC,
    determining the selected voltage,
    in response to determining the voltage and operation, automatically configuring a first pair of switches connected between an output of an electronic power converter and an input of an inverter; and a second pair of switches between an input voltage source and an input to the electronic power converter electrical power conversion to provide the selected output voltage operation from one of a plurality of output voltage operations.

10. The method of claim 9, further comprising: closing the first pair of switches in response to the selected voltage being an AC operation,
    closing a first switch of the second pair of switches and opening a second switch of the second pair of switches; and
    controlling an input power stage by a PWM controller and generating the selected output voltage.

11. The method of claim 10, further comprising: controlling a plurality of inverters to generate an AC output voltage.

12. The method of claim 9, further comprising, in response to the selected voltage being a DC operation,
    determining whether the DC voltage is greater than or less than a DC input voltage;
    opening the first switch and closing the second switch of the second pair of switches in response to the voltage being less than the DC input voltage;
    controlling an input power stage by a PWM controller and generating the selected output voltage;
    disabling the plurality of inverters; and
    generating the selected DC output voltage.

13. The method of claim 12, wherein controlling the input power stage comprises controlling 3-phase shift control, output frequency, and harmonic control in response to the selected voltage being an AC operation.

14. The method of claim 9, wherein the input power stage comprises an H-bridge controlled by the controller.

15. The method of claim 14, further comprising controlling the H-bridge to generate a DC voltage in response to the selected voltage being a DC operation.

16. The method of claim 15, further comprising controlling the H-bridge to generate a sinusoidal square-wave comprising symmetrical positive and negative pulses.

17. The method of claim 9, wherein selecting is accomplished through a user interface, a selector switch, or an automatic selecting system.

18. The method of claim 17, wherein the automatic selecting system further comprises a computer interface or centralized control system control logic.

19. A multifunctional power converter, comprising:

an input stage configured to receive a DC input voltage and convert the DC input voltage to an AC or DC output voltage, a plurality of electrical power conversion electronic circuits, a plurality of DC output voltages for DC power supply at a plurality of DC voltages;

a plurality of AC output voltages for AC power supply at a plurality of AC voltages, a first pair of switches connected between an output of each of the electrical power conversion electronic circuits and an input of an inverter; and a second pair of switches connected between the input stage and an input to each of the electrical power conversion electronic circuits;

a controller configured to control the input stage, the plurality of DC output voltages and the plurality of AC output voltages, wherein the controller is further configured to selectively provide 3-phase shift control, harmonic control, and output frequency control;

wherein said output voltages for AC power provide a plurality of AC voltages, with variable frequency and both in one phase and three phase form.

\* \* \* \* \*